(12) United States Patent
Kim et al.

(10) Patent No.: US 8,653,382 B2
(45) Date of Patent: Feb. 18, 2014

(54) ELECTROSTATIC CAPACITIVE TYPE TOUCH SCREEN PANEL

(75) Inventors: Dongsup Kim, Seoul (KR); Sohaeng Cho, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 150 days.

(21) Appl. No.: 13/242,717

(22) Filed: Sep. 23, 2011

(65) Prior Publication Data

US 2012/0080217 A1 Apr. 5, 2012

(30) Foreign Application Priority Data

Oct. 1, 2010 (KR) .................... 10-2010-0096053

(51) Int. Cl.
  *H05K 1/09* (2006.01)
(52) U.S. Cl.
  USPC .................... 174/261; 174/250; 174/255
(58) Field of Classification Search
  USPC .......................... 174/261, 250, 255
  See application file for complete search history.

(56) References Cited

U.S. PATENT DOCUMENTS

| 8,339,527 B2 * | 12/2012 | Lee et al. ............... 349/12 |
| 2010/0182275 A1 * | 7/2010 | Saitou ................. 345/174 |
| 2011/0216018 A1 * | 9/2011 | Kim et al. ............. 345/173 |

FOREIGN PATENT DOCUMENTS

| KR | 10-2009-0107337 A | 10/2009 |
| KR | 10-2009-0122586 A | 12/2009 |

* cited by examiner

*Primary Examiner* — Hoa C Nguyen
*Assistant Examiner* — Amol Patel
(74) *Attorney, Agent, or Firm* — Birch, Stewart, Kolasch & Birch, LLP

(57) ABSTRACT

A touch screen panel according to an embodiment includes a substrate; an electrode forming part including a plurality of first electrode serials arranged in parallel in a first direction and a plurality of second electrode serials arranged in parallel in a second direction to cross the first direction, and each of the first electrode serials including a plurality of first electrode patterns, each of the second electrode serials including a plurality of second electrode patterns; and a routing wire forming part formed on the substrate outside the electrode forming part, and including a plurality of first routing wires connected to the plurality of first electrode serials, respectively and a plurality of second routing wires connected to the plurality of second electrode serials, respectively.

14 Claims, 6 Drawing Sheets

ELECTROSTATIC CAPACITIVE TYPE TOUCH SCREEN PANEL

This application claims the priority and the benefit of Korea Patent Application No. 10-2010-0096053 filed on Oct. 1, 2010, the entire contents of which is incorporated herein by reference as if fully set forth herein.

BACKGROUND

1. Field of the Invention

Embodiments of this invention relate to a capacitive type touch screen panel.

2. Discussion of the Related Art

Along with the development of the electronics industry, display devices, such as a liquid crystal display, an electroluminescent display, and a plasma display panel having a quick response speed, low power consumption, and an excellent color reproduction rate, have been in the spotlight. The display devices are used for various electronic products such as televisions, monitors for computers, notebook computers, mobile telephones, display units for refrigerators, personal digital assistants, automated teller machines, and the like. In general, the display device interfaces with various input devices such as a keyboard, a mouse, and a digitizer. However, when a separate input device such as a keyboard, a mouse, or digitizer is used, user's dissatisfaction is increased because the user is required to know how to use the separate input device and the separate input device occupies space. Therefore, a convenient and simple input device that can reduce erroneous operation is needed. Also, there is a need for a touch screen panel in which a user can input information by directly contacting a screen with a finger or a pen.

Because the touch screen panel has a simple configuration, which minimizes erroneous operations, the user can perform an input action without using a separate input device, and can quickly and easily manipulate through contents displayed on a screen. Accordingly, the touch screen panel has been applied to various display devices.

Touch screen panels are classified into a resistive type, a capacitive type, an electromagnetic type according to a detection method of a touched portion. The resistive type touch screen panel determines a touched position by a voltage gradient according to a change of resistance in a state that a DC voltage is applied to metal electrodes formed on an upper plate or a lower plate. The capacitive type touch screen panel senses a touched position according to a difference in capacitance created in an upper or lower plate when the user physically contacts with a conductive film formed on the upper or lower plate. The electromagnetic type touch screen panel detects a touched portion by reading an LC value induced as an electromagnetic pen touches a conductive film.

Hereinafter, a related art capacitive type touch screen panel will be described with reference to FIGS. 1 and 2. FIG. 1 is a top plan view illustrating a related art capacitive type touch screen panel, and FIG. 2 is a cross-sectional view illustrating the touch screen panel taken along line I-I' of FIG. 1.

Referring to FIGS. 1 and 2, the related art capacitive type touch screen panel includes an electrode forming part A, a routing wire forming part B, a pad forming part C.

The electrode forming part A is formed on a substrate 10 and includes a plurality of first electrode patterns 40 arranged in parallel in a first direction (for example, X-axis direction), a plurality of bridges 20 connecting neighboring first electrodes 40 each other, and a plurality of second electrode patterns 50 arranged in a second direction (for example, Y-axis direction) to cross over the first electrodes 21.

The routing wire forming part B is formed on the substrate 10 at positions outside the electrode forming part A and includes a plurality of first routing wires 61 connected to the plurality of first electrode patterns 40, respectively, and a plurality of second routing wires 63 connected to the plurality of second electrode patterns 50, respectively.

The pad forming part 60 includes a plurality of first pads 71 connected to the plurality of first electrode patterns 40 through the plurality of first routing wires 61, respectively, and a plurality of second pads 73 connected to the plurality of second electrodes 50 through the plurality of second routing wires 63, respectively.

The capacitive type touch screen panel also includes an insulation layer 30. The insulation layer 30 is formed on the substrate 10 on which the bridges 20 and the first and second routing wires 61 and 63 are formed, and electrically insulate the first electrode patterns 40 from the second electrode patterns 50. The insulation layer 30 includes first contact holes 33 exposing the bridges 20 and second contact holes 35 exposing the first and second routing wires 61 and 63.

However, in the related art capacitive type touch screen panel, the first and second routing wires 61 and 63 are formed to be overlapped with the first electrode patterns 40 or the second electrode patterns 50 only in the second contact holes 35 as shown in FIG. 2. That is, the first and second routing wires 61 and 63 are formed of a single metal layer in most region of the routing wire forming part B. The first and second routing wires 61 and 63 or the insulation layer 30 formed in the most region of the routing wire forming part B are easily scratched in panel fabricating process module fabricating process to manufacture a display device with the touch screen panel because they have a very low hardness. Accordingly, the first and second routing wires 61 and 63 may be shorted or opened due to the scratch. There is a problem that touch operation cannot be perceived when the first and second routing wires 61 and 63 are shorted or opened.

SUMMARY

An object of this invention is to provide a touch screen panel that can prevent the first and second routing wires from being shorted or opened and improve touch performance.

Additional features and advantages of this invention will be set forth in the description which follows, and in part will be apparent from the description, or may be learned by practice of this invention. The objectives and other advantages of this invention will be realized and attained by the structure particularly pointed out in the written description and claims hereof as well as the appended drawings.

To achieve these and other advantages and in accordance with the purpose of this invention, as embodied and broadly described, a touch screen panel includes a substrate; an electrode forming part including a plurality of first electrode serials arranged in parallel in a first direction and a plurality of second electrode serials arranged in parallel in a second direction to cross the first direction, and each of the first electrode serials including a plurality of first electrode patterns, each of the second electrode serials including a plurality of second electrode patterns; a routing wire forming part formed on the substrate outside the electrode forming part, and including a plurality of first routing wires connected to the plurality of first electrode serials, respectively and a plurality of second routing wires connected to the plurality of second electrode serials, respectively; a plurality of first electrode connection patterns formed on the substrate in the electrode forming part, the plurality of first electrode connection patterns being separated from each other, and neighboring pair of the first electrode patterns are connected with each other by the first connection patterns; a plurality of first insulation patterns formed at a cross region of the first and second electrode serials to insulate the first electrode serial from the second electrode serial; a second insulation pattern formed on the substrate on which the first and second routing wires are formed to expose a portion of each of the first and second routing wires in the routing wire forming part; and an anti-scratch layer formed on the second insulation pattern in the routing wire forming part and separated from the first electrode patterns and the second electrode patterns.

In the touch screen panel, the anti-scratch layer is formed on an entire surface of the second insulation pattern in the routing wire forming part.

In the touch screen panel, the anti-scratch layer is formed on the second insulation pattern to overlap at least one portion of the first and second routing wires.

The touch screen panel further comprises a pad forming part, including a plurality of first pads connected to the plurality of first electrode serials through the plurality of first routing wires, respectively, and a plurality of second pads connected to the plurality of second electrode serials through the plurality of second routing wires, respectively, wherein the anti-scratch layer is far away in space from the pad forming part at a predetermined distance.

In the touch screen panel, the first anti-scratch layers are formed of the material same as the first and second electrode pattern.

In the touch screen panel, the first anti-scratch layers are formed of the transparent conductive material.

In the touch screen panel, the first and second routing wires are formed of one or two layers.

In the touch screen panel, if the first and second routing wires are formed of one layer, each of the first and second routing wires is formed of the metal material.

In the touch screen panel, if the first and second routing wires are formed of two layers, lower layers of the first and second routing wires are formed of the metal material, and upper layers of the first and second routing wires are formed of the transparent conductive material.

In the touch screen panel, the metal material includes one of Al, AlNd, Mo, MoTi, Cu, CuOx, and Cr, and the transparent conductive material includes one of ITO, IZO and GZO.

In the touch screen panel, the anti-scratch layer and the first and second routing wires are not connected with each other.

In the touch screen panel, the anti-scratch layer is far away in space from the pad forming part at a range of 50 μm~1,000 μm.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention. In the drawings.

DETAILED DESCRIPTION

Figure 1:
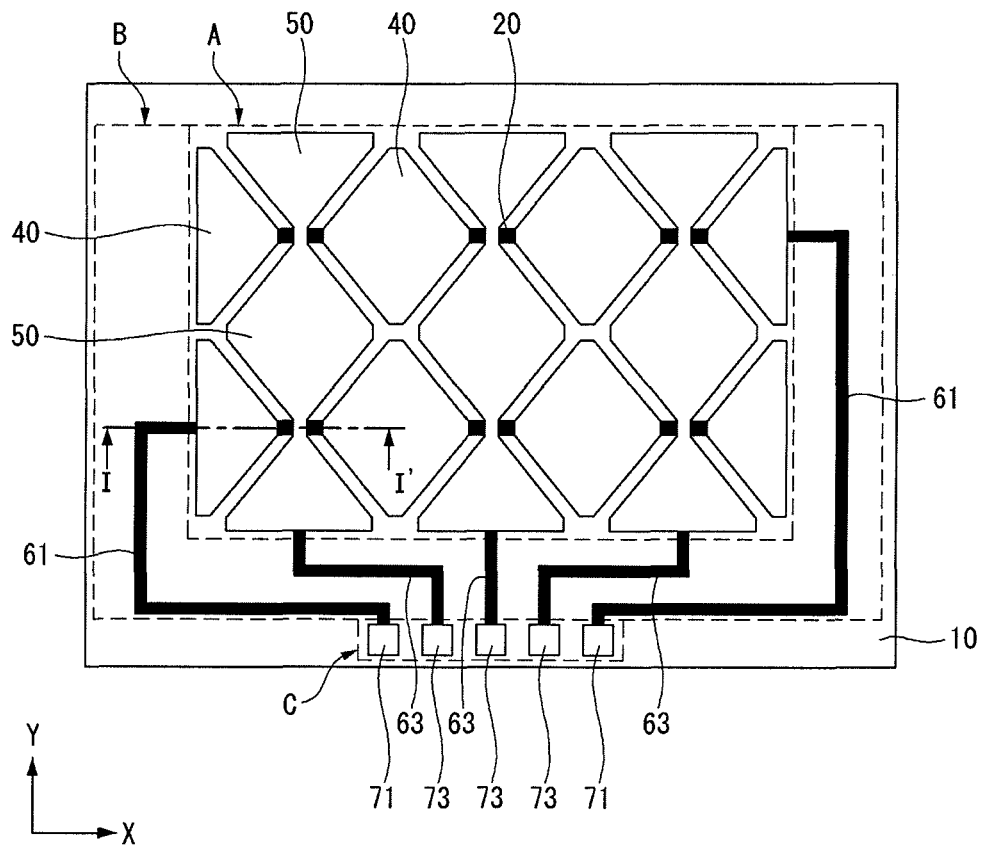
FIG. 1 is a top plan view illustrating a related art electrostatic capacitive type touch screen panel.
Figure 2:
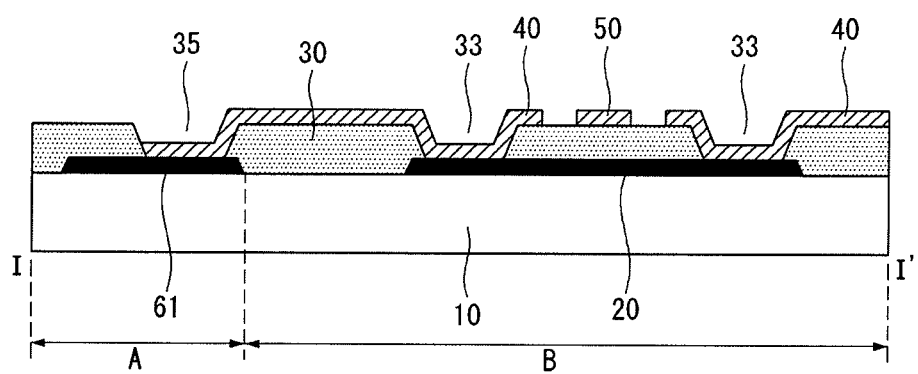
FIG. 2 is a cross-sectional view illustrating the touch screen panel taken along line I-I' of FIG. 1.

Hereinafter, example of various embodiments will be described in detail with reference to drawings. Like reference numerals designate like elements throughout the specification.

Figure 3:
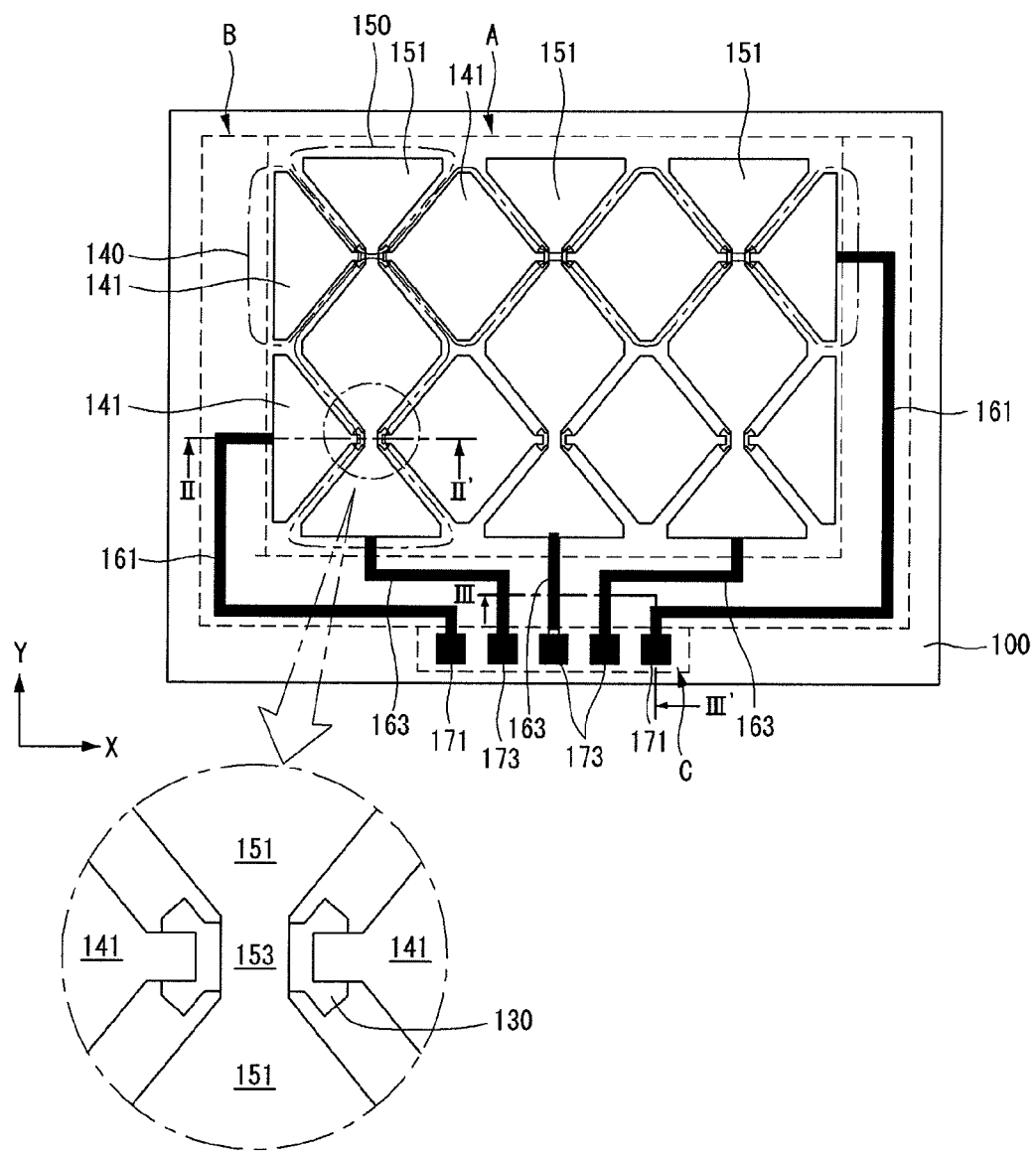
FIG. 3 is a top plan view illustrating an electrostatic capacitive type touch screen panel according to a first embodiment of this invention.
Figure 4A:
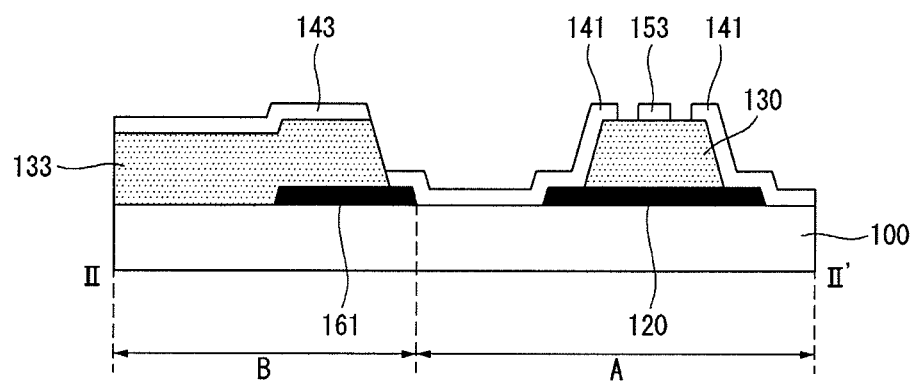
FIGS. 4A and 4B are cross-sectional views illustrating the touch screen panel taken along line II-II' and line III-III' of FIG. 3, respectively as one example in case that first and second routing wires are formed of single layer.
Figure 4B:
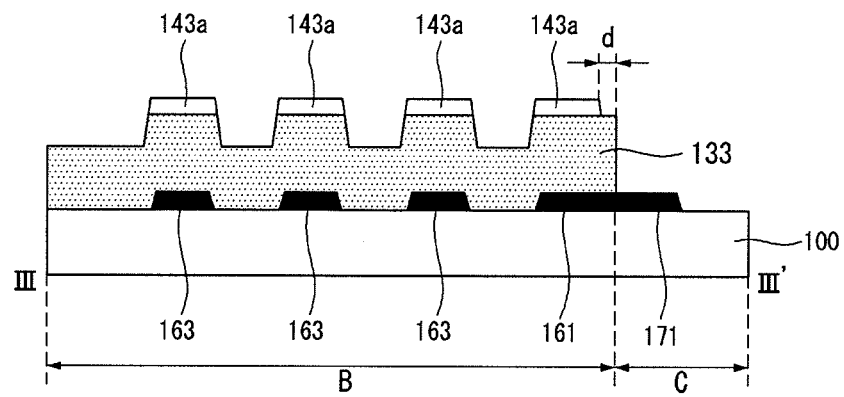
Figure 4C:
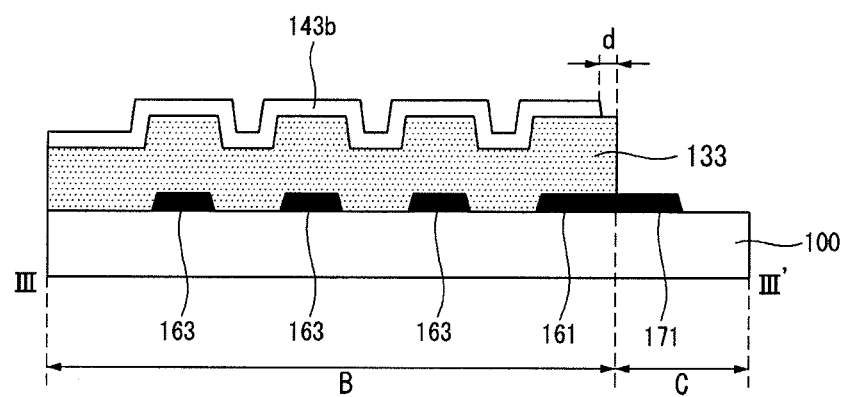
FIG. 4C is cross-sectional views illustrating the touch screen panel taken along line III-III' of FIG. 3 as another example in case that first and second routing wires are formed of single layer.

An electrostatic capacitive type touch screen panel according to an embodiment of this invention will be described with reference to FIG. 3 and FIGS. 4A to 4C. FIG. 3 is a top plan view illustrating an electrostatic capacitive type touch screen panel according to a first embodiment of this invention. FIGS. 4A and 4B are cross-sectional views illustrating the touch screen panel taken along line II-II' and line II-III' of FIG. 3, respectively as one example in case that first and second routing wires are formed of single layer. FIG. 4C is cross-sectional views illustrating the touch screen panel taken along line III-III' of FIG. 3 as another example in case that first and second routing wires are formed of single layer.

Referring to FIG. 3, the touch screen panel according to the embodiment of this invention includes an electrode forming part A, a routing wire forming part B, and a pad forming part C.

The electrode forming part A includes a plurality of first electrode serials 140 optionally arranged in parallel in a first direction (for example, an X-axis direction) and a plurality of second electrode serial 150 optionally arranged in parallel in a second direction (for example, Y-axis direction) to cross the first direction. The electrode forming part A also includes a plurality of insulation patterns 130 formed at the a cross region of the first and second electrode serials 140 and 150 to insulate the first electrode serial 140 from the second electrode serial 150.

Each of the first electrode serials 140 includes first electrode patterns 141 having a triangle, a rectangle, a square, a quadrangle, a diamond shape, a polygonal shape, and the like, and first connection patterns 120 for connecting neighboring first electrode patterns 141. Any suitable shape of the first electrode pattern 141 may be used.

Each of the second electrode serials 150 includes second electrode patterns 151 having a triangle, a rectangle, a square, a quadrangle, a diamond shape, a polygonal shape, which may be similar to the first electrode patterns 141 and second connection patterns 153 for connecting neighboring second electrode patterns 151. Any suitable shape of the second electrode pattern 151 may be used.

Each of the first connection patterns 120 is formed between the insulation layer 130 and the substrate 100 at a cross region of the first electrode serial 140 and the second electrode serial 150 to connect neighboring first electrode patterns 141 each other. On the other hand, each of the second connection patterns 153 is integrally formed with the second electrode patterns 151 and formed on the insulation patterns 130 at a cross region of the first electrode serial 140 and the second electrode serial 150.

In the embodiment of this invention, the first and second electrode patterns 141 and 151, and the second connection pattern 153 are formed of a transparent conductive material such as indium tin oxide (ITO), indium zinc oxide (IZO) and gallium-doped zinc oxide (GZO). The first connection pattern 120 is formed of metal material such as Al, AlNd, Mo, MoTi, Cu, CuOx and Cr. Alternately, the first connection pattern 120 is formed of the transparent conductive material such as ITO, IZO and GZO. The first connection pattern 120 is formed of multiple layers. If the first connection pattern 120 is formed of multiple layers, a lower layer of the first connection pattern 120 is formed of the metal material such as Al, AlNd, Mo, MoTi, Cu, CuOx and Cr, and an upper layer of the first connection pattern 120 is formed of the transparent material such as ITO, IZO and GZO. The first insulation patterns 130 are formed of inorganic material such as SiNx and SiOx. However the first insulation patterns 130 may be formed of organic material such as photo-acryl.

The routing wire forming part B is formed on the substrate 100 at positions outside the electrode forming part A, and includes a plurality of first routing wires 161 connected to the plurality of first electrode serials 140, respectively and a plurality of second routing wires 163 connected to the plurality of second electrode serials 150, respectively. The routing wire forming part B also includes a second insulation pattern 133 covering the first and second routing wires 161 and 163.

The routing wire forming part B also includes an anti-scratch layer 143 formed on the insulation pattern 133. The anti-scratch layer 143 is formed to be overlapped with the first and second routing wires 161 and 163 on the second insulation pattern 133 as shown in FIG. 4B. Alternately, the anti-scratch layer 143 may be formed on an entire surface of the second insulation pattern 133 as shown in FIG. 4C. However, this invention is not limited to the above-mentioned embodiment. The construction in which the anti-scratch layer 143 is formed in a regular patterns or random patterns on the second insulation pattern 133 in the routing forming part B to prevent the first and second routing wires 161 and 163 from being scratched belongs to scope of this invention.

If the first and second routing wires 161 and 163 are formed of single layer, the first and second routing wires 161 and 163 is formed of the metal material such as Al, AlNd, Mo, MoTi, Cu, CuOx and Cr. If the first and second routing wires 161 and 163 are formed of multiple layers, lower layers of the first and second routing wires 161 and 163 are formed of the metal material such as Al, AlNd, Mo, MoTi, Cu, CuOx and Cr, and upper layers of the first and second routing wires 161 and 163 are formed of the transparent material such as ITO, IZO and GZO. The second insulation pattern 133 is formed of inorganic material such as SiNx and SiOx. However the second insulation pattern 133 may be formed of organic material such as photo-acryl.

The pad forming part C includes a plurality of first pads 171 connected to the plurality of first electrode serials 140 through the plurality of first routing wires 161, respectively, and a plurality of second pads 173 connected to the plurality of second electrode serials 150 through the plurality of second routing wires 163, respectively.

In the embodiment of this invention, the second insulation pattern 133 is formed to expose ends of the first and second routing wires 161 and 163 towards the electrode forming part A at boundary area between the electrode forming part A and the routing wire forming part B. Also, the anti-scratch layer 143 is formed on the second insulation pattern 133 in the routing wire forming part B to expose the ends of the first and second routing wires 161 and 163 towards the electrode forming part A.

The anti-scratch layer 143 is formed of the transparent conductive material such as ITO, IZO and GZO having a very high hardness as the first and second electrode patterns 141 and 151. Accordingly, it is possible to prevent the first and second routing wires 161 and 163 from being scratched by the anti-scratching layer 143 during panel fabricating process, module fabrication process for applying the touch screen panel to display devices or a touch operation for driving the screen panel. As a result, anti-scratch effect for the second insulation 133 and/or the first and second routing wires 161 and 163 is obtained without further process.

Hereinafter, touch screen panels according to the embodiment of this invention will be described with reference to FIGS. 4A to 4C.

FIGS. 4A to 4C are cross-sectional views illustrating the touch screen panel in case that first and second routing wires 161 and 163 are formed of single layer. FIG. 4A is cross-sectional view illustrating the touch screen panel taken along line II-II' of FIG. 3, and FIG. 4B is cross-sectional view illustrating the touch screen panel taken along line III-III' of FIG. 3. FIGS. 4A and 4B shows constructions in which the transparent conductive material such as ITO, IZO and GZO are formed on a portion of the second insulation pattern 133 in the routing wire forming part B. FIG. 4C is cross-sectional views illustrating the touch screen panel taken along line III-III' of FIG. 3 and shows a construction in which the transparent conductive material such as ITO, IZO and GZO are formed on an entire surface of the second insulation pattern 133 in the routing wire forming part B.

Referring to FIGS. 4A to 4C, the outermost first and second electrode patterns 141 and 151 in the electrode forming part A are extended to cover exposed portions of the first and second routing wires 161 and 163 formed on the substrate 100, but are not connected with the anti-scratch layer 143. In this embodiment, the outermost first electrode 141 connects the first routing wire 161 to the first connection pattern 120 which connects neighboring first electrode patterns 141 each other. Accordingly, there is an electrical path capable of transferring a touch signal if a touch is performed on the touch screen panel.

Also the anti-scratch layer 143a is formed on the second insulation pattern 133 in the routing wire forming part B to overlapped with the first and second routing wires 161 and 163 as shown in FIG. 4B. Alternatively, the anti-scratch layer 143b is formed on an entire surface of the second insulation pattern 133 in the routing wire forming part B as shown in FIG. 4C. Accordingly, it is possible to prevent the first and second routing wires 161 and 163 and/or the second insulation pattern 133 from being scratched by the anti-scratching layer 143 during panel fabricating process, module fabrication process for applying the touch screen panel to display devices or a touch operation for driving the screen panel.

Also, there is no electrical path between the anti-scratch layer 143 and the first and second routing wires 161 and 163 because they are not connected with each other. Accordingly, there is no parasitic capacitance between them. As a result, it is possible to improve the performance of the touch screen panel.

Also the anti-scratch layers 143a and 143b are formed on the second insulation pattern 133 in the routing wire forming part B adjacent to the pad forming part C as shown in FIG. 4B. The anti-scratch layers 143a and 143b are far away in space from the pad forming part C at a predetermined distance d. In the embodiments of this invention, it is preferable that the predetermined distance d is a range of 50 μm~1,000 μm. If the distance d is less than 50 μm, the anti-scratch layers 143a and/or 143b may be easily contacted with wires (not shown) connecting the first pad 171 and/or the second pad 173 to an outer circuit. Also, if the distance d is larger than 1,000 μm, the anti-scratch layers 143a and/or 143b cannot effectively protect a portion of the routing wires 161 and/or 163 because the portion of the routing wires 161 and/or 163 are uncovered the anti-scratch layers 143a and/or 143b. As thus, because the anti-scratch layers 143a and 143b are far away in space from the pad forming part C, the wires (not shown) for connecting the first pad 171 and/or the second pad 173 to the outer circuit are not contacted with the anti-scratch layers 143a and 143b. Accordingly, there is no electrical path between the anti-scratch layers 143a and 143b and the first and second pads 171 and 173 because they are not connected with each other. As a result, it is possible to improve the performance of the touch screen panel because there is no parasitic capacitance between them.

Hereinafter, touch screen panels according to the embodiment of this invention will be described with reference to FIGS. 5A to 5C.

Figure 5A:
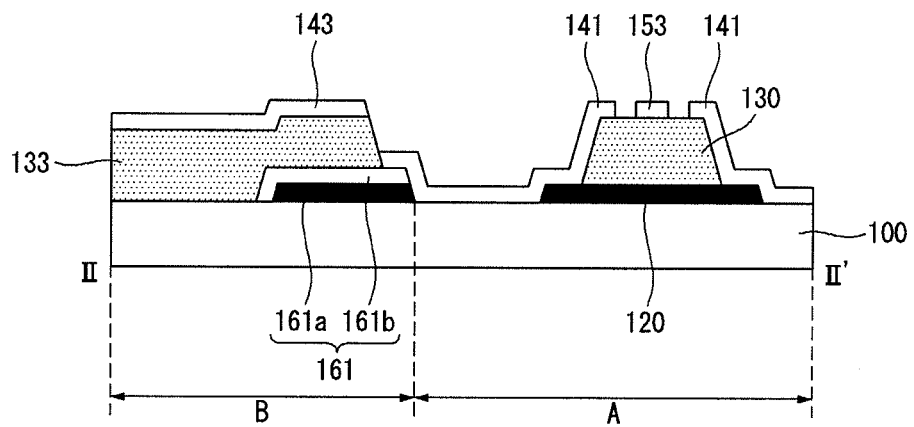
FIGS. 5A and 5B are cross-sectional views illustrating the touch screen panel taken along line II-II' and line III-III' of FIG. 3, respectively as one example in case that first and second routing wires are formed of double layers.
Figure 5B:
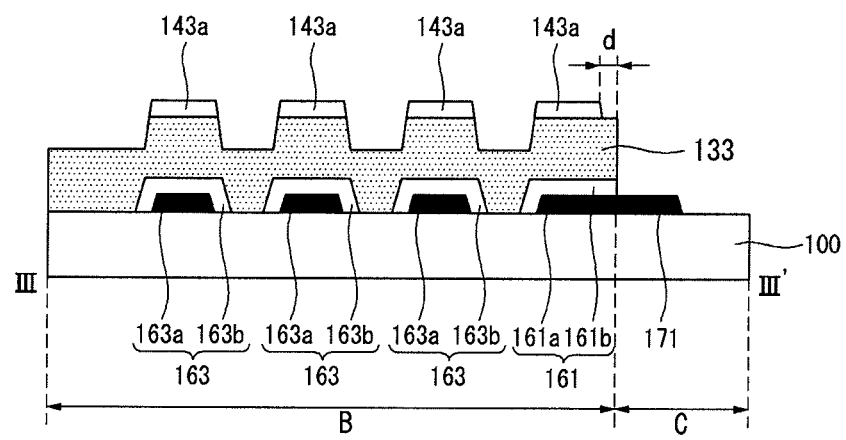
Figure 5C:
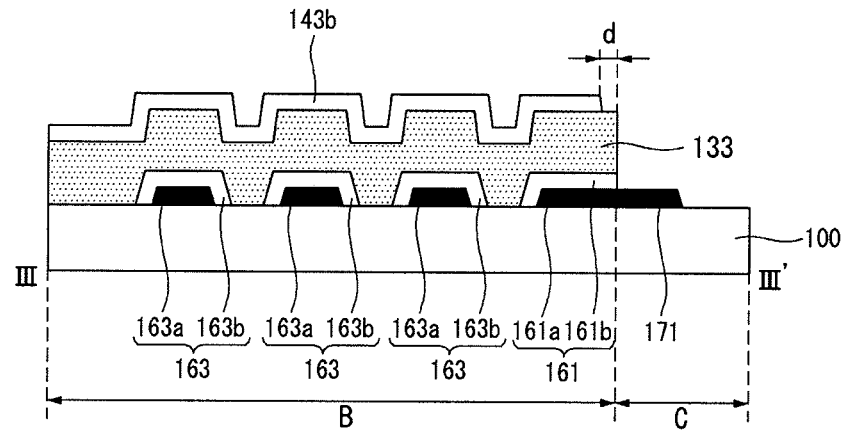
FIG. 5C is cross-sectional views illustrating the touch screen panel taken along line III-III' of FIG. 3 as another example in case that first and second routing wires are formed of double layers.

FIGS. 5A to 5C are cross-sectional views illustrating the touch screen panel in case that first and second routing wires 161 and 163 are formed of multiple layers including a lower layer 161a formed of a metal material and an upper layer 161b formed a transparent conductive material. FIG. 5A is cross-sectional view illustrating the touch screen panel taken along line II-II' of FIG. 3, and FIG. 5B is cross-sectional view illustrating the touch screen panel taken along line III-III' of FIG. 3. FIGS. 5A and 5B shows constructions in which the transparent conductive material such as ITO, IZO and GZO same as the first and second electrode patterns 141 and 151 are formed on a portion of the second insulation pattern 133 in the routing wire forming part B. FIG. 5C is cross-sectional views illustrating the touch screen panel taken along line III-III' of FIG. 3 and shows a construction in which the transparent conductive material such as ITO, IZO and GZO same as the first and second electrode patterns 141 and 151 are formed on an entire surface of the second insulation pattern 133 in the routing wire forming part B.

Constructions of FIGS. 5A to 5C are substantially same as that of FIGS. 4A to 4C excepting that the first and second routing wires 161 and 163 are formed of a lower layer 161a including a metal material such as Al, AlNd, Mo, MoTi, Cu and CuOx, and an upper layer 161b including a transparent conductive material such as ITO, IZO and GZO. Therefore, hereinafter, constructional elements different from FIGS. 4A to 4C will be described with reference to FIGS. 5A to 5C.

Hitherto, in description related to FIGS. 4A to 4C, the first and second routing wires 161 and 163 and the first connection pattern 120 are formed of single layer. Also, in description related to FIGS. 5A to 5C, the first and second routing wires 161 and 163 are formed of multiple layers 161a and 161b and the first connection pattern 120 is formed of single layer. However, this invention is not limited thereto.

For example, if the anti-scratch layer 143 is formed on the second insulation pattern 133 in the routing wire forming part B but the anti-scratch layer 143 is apart away in space from the first and second electrode patterns 141 and 151, it is possible that all of the first and second routing wires 161 and 163 and the first connection pattern 120 are formed of multiple layers, or the first and second routing wires 161 and 163 are formed of single layer and the first connection pattern 120 is formed of multiple layers.

If all of the first and second routing wires 161 and 163 and the first connection pattern 120 are formed of multiple layers, the lower layers of them are formed of a metal material such as Al, AlNd, Mo, MoTi, Cu, CuOx, and Cr, and the upper layers of them are formed of a transparent conductive material ITO, IZO and GZO. If the first and second routing wires 161 and 163 are formed of single layer and the first connection pattern 120 is formed of multiple layers, the first and second routing wires 161 and 163 are formed of a metal material such as Al, AlNd, Mo, MoTi, Cu, CuOx, and Cr, and the first connection pattern 120 is formed of a lower layer including metal material such as Al, AlNd, Mo, MoTi, Cu, CuOx, and Cr and an upper layer including a transparent conductive material ITO, IZO and GZO.

The touch screen panel according to the embodiment of this invention further may include a protection layer (not shown) formed on an entire surface thereof to protect the anti-scratch layer 143. The protection layer is formed of organic material such as photo-acryl or inorganic material such as SiNx.

According to the example embodiment of this invention, the anti-scratch layer 143 is formed in regular patterns or random patterns on the second insulation pattern 133 in the routing forming part B so that the anti-scratch layer 143 is overlapped with at least one portion the first and second routing wires 161 and 163. Otherwise the anti-scratch layer 143 is formed on the second insulation pattern 133 in the routing forming part B so that the anti-scratch layer 143 is overlapped with the first and second routing wires 161 and 163, or the anti-scratch layer 143 is formed on an entire surface of the second insulation pattern 133 in the routing forming part B so that the anti-scratch layer 143 is overlapped with the first and second routing wires 161 and 163. Accordingly, it is possible to prevent the first and second routing wires 161 and 163 from being scratched to remove phenomena that they are open or shorted.

According to the example embodiment of this invention, the first and second electrode patterns 141 and 151 in the electrode forming part A are not contacted with the anti-scratch layer 143. Accordingly, there is no parasitic capacitance between them. As a result, it is possible to improve the performance of the touch screen panel.

According to the example embodiment of this invention, the anti-scratch layers 143a and 143b formed on the second insulation pattern 133 in the routing wire forming part B adjacent to the pad forming part C are far away in space from the pad forming part C at a predetermined distance. Wires for connecting the first pad 171 and/or the second pad 173 to an outer circuit are not contacted with the anti-scratch layers 143a and 143b. Accordingly, there is no electrical path between the anti-scratch layers 143a and 143b and the first and second pads 171 and 173 because they are not connected with each other. As a result, it is possible to improve the performance of the touch screen panel because there is no parasitic capacitance between them.

In embodiments shown in FIGS. 4A to 4C, and FIGS. 5A to 5C, the first and second pads 171 and 173 are not covered with the second insulation pattern 133. However this invention is not limited thereto. For example, as the first and second routing wires 161 and 163, it is possible to form the first and second pads 171 and 173 so that they are covered with the second insulation pattern 133.

The touch screen panels according to the embodiments of this invention may be applied to display devices such as a liquid crystal display, a field emission display, a plasma display panel, an electroluminescence device, an electrophoresis display and a flexible display. In these cases, the substrates of the touch screen panels may be also used as substrates of the display devices.

Although example embodiments have been described with reference to a number of illustrative examples, it should be understood that numerous other modifications and changes can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen panel, comprising:
    a substrate;
    an electrode forming part including a plurality of first electrode serials arranged in parallel in a first direction and a plurality of second electrode serials arranged in parallel in a second direction to cross the first direction, and each of the first electrode serials including a plurality of first electrode patterns, each of the second electrode serials including a plurality of second electrode patterns;
    a routing wire forming part formed on the substrate outside the electrode forming part, and including a plurality of first routing wires connected to the plurality of first electrode serials, respectively and a plurality of second routing wires connected to the plurality of second electrode serials, respectively;
    a plurality of first electrode connection patterns formed on the substrate in the electrode forming part, the plurality of first electrode connection patterns being separated from each other, and neighboring pair of the first electrode patterns are connected with each other by the first connection patterns;
    a plurality of first insulation patterns formed at a cross region of the first and second electrode serials to insulate the first electrode serial from the second electrode serial;
    a second insulation pattern formed on the substrate on which the first and second routing wires are formed to expose a portion of each of the first and second routing wires in the routing wire forming part; and
    an anti-scratch layer formed on the second insulation pattern in the routing wire forming part and separated from the first electrode patterns and the second electrode patterns,
    wherein the anti-scratch layer includes a plurality of anti-scratch patterns to be overlapped with the plurality of first and second routing wires, respectively, and
    wherein the plurality of anti-scratch patterns are separated from each other, and each of the plurality of anti-scratch patterns is overlapped with each of the plurality of first and second routing wires.

2. The touch screen panel according to claim 1, wherein the anti-scratch layer is formed on an entire surface of the second insulation pattern in the routing wire forming part.

3. The touch screen panel according to claim 1, wherein the anti-scratch layer is formed on the second insulation pattern to overlap at least one portion of the first and second routing wires.

4. The touch screen panel according to claim 1, the touch screen panel further comprising a and forming part, including a plurality of first pads connected to the plurality of first electrode serials through the plurality of first routing wires, respectively, and a plurality of second pads connected to the plurality of second electrode serials through the plurality of second routing wires, respectively, wherein the anti-scratch layer is far away in space from the pad forming part at a predetermined distance.

5. The touch screen panel according to claim 4, wherein the anti-scratch layer is far away in space from the pad forming part at a range of 50 μm~1,000 μm.

6. The touch screen panel according to claim 1 wherein the anti-scratch layer is formed of the same material as the first and second electrode pattern.

7. The touch screen panel according to claim 1, wherein the anti-scratch layer is formed of a transparent conductive material.

8. The touch screen pane according to claim 7, wherein the transparent conductive material includes one of ITO, IZO and GZO.

9. The touch screen panel according to claim 1, wherein the first and second routing wires are formed of one or two layers.

10. The touch screen panel according to claim 9, wherein if the first and second routing wires are formed of one layer, each of the first and second routing wires is formed of a metal material.

11. The touch screen panel according to claim 10, wherein the metal material includes one of Al, AlNd, Mo, MoTi, Cu, CuOx, and Cr.

12. The touch screen panel according to claim 9, wherein if the first and second routing wires are formed of two layers, lower layers of the first and second routing wires are formed of a metal material, and upper layers of the first and second routing wires are formed of a transparent conductive material.

13. The touch screen panel according to claim 12, wherein the metal material includes one of Al, AlNd, Mo, MoTi, Cu, CuOx, and Cr, and the transparent conductive material includes one of ITO, IZO and GZO.

14. The touch screen panel according to claim 1, wherein the anti-scratch layer and the first and second routing wires are not connected with each other.

* * * * *